(12) United States Patent
Villars et al.

(10) Patent No.: US 9,524,504 B2
(45) Date of Patent: Dec. 20, 2016

(54) PROTECTING PRIVACY IN AUDIENCE CREATION

(75) Inventors: Curtis Villars, Chatham, NJ (US);
Todd Lowenberg, Redding, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 42 days.

(21) Appl. No.: 13/437,987

(22) Filed: Apr. 3, 2012

(65) Prior Publication Data
US 2013/0024242 A1    Jan. 24, 2013

Related U.S. Application Data

(60) Provisional application No. 61/509,386, filed on Jul. 19, 2011.

(51) Int. Cl.
*G06Q 30/02*    (2012.01)
*G06Q 10/00*    (2012.01)

(52) U.S. Cl.
CPC .............. *G06Q 30/02* (2013.01); *G06Q 10/00* (2013.01); *G06Q 30/0201* (2013.01); *G06Q 30/0204* (2013.01); *G06Q 30/0269* (2013.01)

(58) Field of Classification Search
CPC  G06Q 30/0201; G06Q 30/02; G06Q 30/0204; G06Q 30/0269
(Continued)

(56) References Cited

U.S. PATENT DOCUMENTS 7,949,561 B2    5/2011  Briggs
2002/0042738 A1  4/2002  Srinivasan et al.
(Continued)

FOREIGN PATENT DOCUMENTS

JP    2007-035022 A    2/2007
KR    10-2009-0000221 A    1/2009
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jan. 21, 2013, issued in International Application No. PCT/US2012/047060 corresponding to U.S. Appl. No. 13/438,346. (8 pages).

(Continued)

*Primary Examiner* — Stephanie Delich
(74) *Attorney, Agent, or Firm* — Buchanan Ingersoll & Rooney PC

(57) ABSTRACT

A method for generating microsegments includes retrieving a first set of information including activities attributable to a first plurality of entities and first entity identifiers; retrieving a second set of information including characteristics attributable to the first plurality of entities and second entity identifiers; combining the first and second sets of information using the first and second entity identifiers to obtain a combined set of information, the combined set of information not including personally identifiable information; generating a plurality of microsegments based on selected activities and/or characteristics criteria from the combined set of information; receiving a third set of information including characteristics attributable to a second plurality of entities; and matching characteristics in respective microsegments to characteristics of entities in the second plurality of entities to identify an audience of entities that have a propensity to carry out certain activities based on the selected activities and/or characteristics.

13 Claims, 11 Drawing Sheets

(58) Field of Classification Search
USPC .......................................................... 705/7.29
See application file for complete search history.

(56) References Cited

U.S. PATENT DOCUMENTS

| | | | |
|---|---|---|---|
| 2002/0087967 A1* | 7/2002 | Conkwright et al. ............ | 725/1 |
| 2002/0091650 A1* | 7/2002 | Ellis ................................ | 705/74 |
| 2005/0166233 A1* | 7/2005 | Beyda et al. .................... | 725/46 |
| 2007/0198327 A1 | 8/2007 | Yazdani et al. | |
| 2007/0214037 A1* | 9/2007 | Shubert et al. ................. | 705/10 |
| 2007/0260519 A1 | 11/2007 | Sattley et al. | |
| 2008/0046748 A1 | 2/2008 | Fujimoto | |
| 2008/0133325 A1 | 6/2008 | De et al. | |
| 2009/0259590 A1 | 10/2009 | Carapelli | |
| 2010/0106577 A1 | 4/2010 | Grimes | |
| 2010/0114668 A1 | 5/2010 | Klein et al. | |
| 2010/0161379 A1 | 6/2010 | Bene et al. | |
| 2010/0169803 A1* | 7/2010 | Mazzei et al. ................. | 715/760 |
| 2011/0119111 A1 | 5/2011 | Hanna | |
| 2011/0137721 A1 | 6/2011 | Bansal | |
| 2012/0022945 A1 | 1/2012 | Falkenborg et al. | |
| 2012/0042253 A1 | 2/2012 | Priyadarshan et al. | |
| 2012/0166272 A1 | 6/2012 | Wiley et al. | |
| 2013/0024274 A1 | 1/2013 | Villars | |

FOREIGN PATENT DOCUMENTS

| | | |
|---|---|---|
| KR | 10-2009-0085848 A | 8/2009 |
| KR | 10-2010-0090903 A | 8/2010 |
| WO | 2007/044596 A2 | 4/2007 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jan. 29, 2013, issued in International Application No. PCT/US2012/047063 corresponding to U.S. Appl. No. 13/437,987. (10 pages).

Villars et al., U.S. Appl. No. 13/554,402, entitle "System and Method for Protecting Consumer Privacy in the Measuring of the Effectiveness of Advertisements" filed Jul. 20, 2012.

Notification of Transmittal of the International Search Report (Forms PCT/ISA/220 and PCT/ISA/210) and the Written Opinion of the International Searching Authority (Form PCT/ISA/237) issued on Oct. 25, 2013, by the Korean Intellectual Property Office in the International Application No. PCT/US2013/051245. (11 pages).

Office Action issued by the U.S. Patent and Trademark Office in the U.S. Appl. No. 13/438,346, mailed May 5, 2014, U.S. Patent and Trademark Office, Alexandria, VA. (18 pages).

Final Office Action issued by the U.S. Patent and Trademark Office in the U.S. Appl. No. 13/438,346, mailed Dec. 26, 2014, U.S. Patent and Trademark Office, Alexandria, VA (23 Pages).

1st Office Action issued by the U.S. Patent and Trademark Office in the U.S. Appl. No. 13/554,402, mailed Oct. 31, 2014, U.S. Patent and Trademark Office, Alexandria, VA (41 Pages.)

Final Office Action issued by the U.S. Patent and Trademark Office in the U.S. Appl. No. 13/554,402, mailed Feb. 26, 2015, U.S. Patent and Trademark Office, Alexandria, VA (19 Pages).

* cited by examiner

Example: Demographic Tracking Agency External Database and Financial Transaction Processing Agency Database Without PII External Database

| Encrypted Identifiers | Age Groups | Income Groups | Marital Status | Presence of Children by Age Grp | Zip Code |
|---|---|---|---|---|---|
| 123456789 | C | B | B | 000 | 12345 |
| 123456790 | C | B | B | 000 | 12345 |
| 123456791 | C | D | A | 100 | 23456 |
| 123456792 | D | D | A | 100 | 23456 |
| 123456793 | D | F | B | 100 | 12345 |
| 123456794 | C | F | B | 020 | 12345 |
| 123456795 | C | B | B | 000 | 12345 |
| 123456796 | C | D | B | 000 | 12345 |
| 123456797 | C | D | A | 100 | 12345 |
| 123456798 | C | D | A | 100 | 23456 |
| 123456799 | D | F | B | 000 | 12345 |
| 123456800 | D | B | B | 000 | 12345 |
| 123456801 | C | B | B | 000 | 12345 |
| 123456802 | C | D | A | 100 | 12345 |
| 123456803 | C | D | A | 100 | 23456 |
| 123456804 | C | F | B | 100 | 23456 |
| 123456805 | D | F | B | 000 | 12345 |
| 123456806 | D | D | A | 000 | 12345 |
| 123456807 | C | D | A | 100 | 23456 |
| 123456808 | C | B | B | 100 | 23456 |
| 123456809 | C | C | B | 000 | 12345 |
| 123456810 | B | C | B | 000 | 23456 |
| 123456811 | B | C | B | 000 | 23456 |

Database Without PII

| Encrypted Identifiers | Spend Prop 1 | Spend Prop 2 | DPI | Spend Index 1 | Spend Index 2 |
|---|---|---|---|---|---|
| 123456789 | 29 | 41 | 66 | 59 | 61 |
| 123456790 | 38 | 52 | 76 | 71 | 89 |
| 123456791 | 51 | 57 | 90 | 82 | 57 |
| 123456792 | 59 | 66 | 67 | 62 | 62 |
| 123456793 | 67 | 82 | 77 | 69 | 86 |
| 123456794 | 79 | 89 | 92 | 78 | 46 |
| 123456795 | 31 | 41 | 69 | 60 | 50 |
| 123456796 | 37 | 49 | 79 | 72 | 86 |
| 123456797 | 50 | 61 | 88 | 81 | 35 |
| 123456798 | 59 | 66 | 70 | 62 | 62 |
| 123456799 | 69 | 76 | 80 | 69 | 86 |
| 123456800 | 79 | 91 | 92 | 78 | 78 |
| 123456801 | 28 | 37 | 36 | 26 | 58 |
| 123456802 | 41 | 47 | 46 | 42 | 86 |
| 123456803 | 47 | 58 | 59 | 51 | 89 |
| 123456804 | 61 | 72 | 39 | 29 | 62 |
| 123456805 | 71 | 77 | 47 | 42 | 86 |
| 123456806 | 78 | 86 | 59 | 50 | 38 |
| 123456807 | 29 | 40 | 40 | 26 | 60 |
| 123456808 | 38 | 51 | 47 | 39 | 90 |
| 123456809 | 42 | 62 | 44 | 68 | 47 |
| 123456810 | 78 | 86 | 59 | 50 | 38 |
| 123456811 | 45 | 71 | 40 | 33 | 55 |

FIG. 3

Example: Resulting Micro Segment file becomes the driver for targeting and measurement Micro Segmentation File Created From Files

| Micro Segment # | Age Groups | Income Groups | Marital Status | Presence of Children by Age Grp | Zip Code | Avg Spend Prop 1 | Avg Spend Prop 2 | Avg DFI | Avg Spend Index 1 | Avg Spend Index 2 | Cnt of Indiv in Segment |
|---|---|---|---|---|---|---|---|---|---|---|---|
| MS1 | C | B | B | 000 | 12345 | 34.0 | 44.5 | 62.0 | 55.0 | 73.3 | 5 |
| MS2 | C | D | A | 100 | 23456 | 49.3 | 58.9 | 62.5 | 54.0 | 64.6 | 8 |
| MS3 | D | F | B | 000 | 12345 | 73.8 | 83.5 | 74.5 | 64.3 | 70.0 | 6 |
| MS4 | C | B | B | 000 | 12346 | 42.0 | 62.0 | 44.0 | 68.0 | 47.0 | 1 |
| MS5 | B | C | B | 000 | 23456 | 61.5 | 78.5 | 49.5 | 41.5 | 46.5 | 2 |

Note: Because MS4 only contains one individual, that person would be assigned to the "adjacent" Micro Segment, MS1. In this case "adjacent" is defined as the neighboring zip code.

FIG. 4A

Members of Micro Segment MS1

| Encrypted Identifiers | Spend Prop 1 | Spend Prop 2 | DFI | Spend Index 1 | Spend Index 2 |
|---|---|---|---|---|---|
| 123456789 | 29 | 41 | 66 | 59 | 61 |
| 123456790 | 38 | 52 | 76 | 71 | 89 |
| 123456795 | 31 | 41 | 69 | 60 | 60 |
| 123456796 | 37 | 49 | 79 | 72 | 86 |
| 123456801 | 28 | 37 | 36 | 26 | 58 |
| 123456802 | 41 | 47 | 46 | 42 | 86 |
| 123456809 | 42 | 62 | 44 | 68 | 47 |

FIG. 4B

PROTECTING PRIVACY IN AUDIENCE CREATION

This application claims the priority benefit of commonly assigned U.S. Provisional Application 61/509,386, "Protecting Privacy in Audience Targeting," by Curtis Villars, filed Jul. 19, 2011. The subject matter of the foregoing is herein incorporated by reference in its entirety.

FIELD

The present disclosure relates to methods for protecting privacy in the creation of audiences, specifically for identifying ideal consumers for marketing purposes without the use of personally identifiable information.

BACKGROUND

In the ever expanding information age, consumers have become increasingly concerned with their privacy at the same time that merchants and advertisers have become concerned with learning as much as they can about their consumers. Traditionally, consumers appreciate when merchants learn more about them. For example, consumers often participate in merchant loyalty programs that allow the merchant to track the consumer's spending, with the consumer receiving offers and/or discounts targeted directly to them. Participating in such a program, or in any program designed to provide the consumer with advertising made to suit their interests, has traditionally required the participant to provide personal information.

In times of the increasing worries of identity theft and the increasing desire to maintain personal privacy and security, consumers are more apprehensive in situations where they are asked to provide personal information. Many consumers will refrain from participating, or may provide false information in order to protect their privacy and personal or other sensitive information. As a result of this shift, there have been a variety of laws and regulations passed by various jurisdictions, associations, and groups in an effort to increase consumer privacy, though at an expense to the advertisers and merchants that previously benefited from such information.

Thus, there is a perceived opportunity to improve the ability for merchants and advertisers to advertise to and better serve ideal groups of consumers while protecting the privacy of those same consumers.

SUMMARY

The present disclosure provides for a system and method for generating microsegments for without the use of personally identifiable information (PII).

An exemplary method for generating audiences of a population of entities without using personally identifiable information includes retrieving, from a first database, a first set of information including activities (e.g., payment card transactions) attributable to a first plurality of entities (e.g., payment card holders) and first entity identifiers (e.g., encrypted account numbers) associated with respective entities of the first plurality of entities, and retrieving, from a second database, a second set of information including characteristics (e.g., demographic information) attributable to the first plurality of entities and second entity identifiers (e.g., encrypted account numbers) associated with respective entities of the first plurality of entities. The method further includes combining the first set of information and the second set of information using the first and second entity identifiers to obtain a combined set of information including entity information associated with the first plurality of entities, wherein the combined set of information does not include personally identifiable information (e.g., payment card transactions associated with demographics for a group of people, but not including account numbers or other personally identifiable information). The method then includes generating a plurality of microsegments based on at least one of (1) selected activities criteria and (2) selected characteristics criteria from the combined set of information, and receiving, from a third party, a third set of information including characteristics (e.g., demographic information) attributable to a second plurality of entities, the third party having contact information (e.g., email address, mailing address, cookie information, etc.) for entities in the second plurality of entities. The method also includes matching characteristics in respective microsegments to characteristics of entities in the second plurality of entities to identify an audience of entities that have a propensity to carry out certain activities based on the selected activities criteria and/or selected characteristics criteria used in forming the microsegments, to enable the third party to contact the audience to induce desired activities in at least a portion of the entities in the audience.

An exemplary system for generating audiences of a population of entities without using personally identifiable information includes a first database, a second database, and a processor. The first database is configured to retrieve a first set of information including activities attributable to a first plurality of entities and first entity identifiers associated with respective entities of the first plurality of entities. The second database is configured to retrieve a second set of information including characteristics attributable to the first plurality of entities and second entity identifiers associated with respective entities of the first plurality of entities. The processor is configured to combine the first set of information and the second set of information using the first and second entity identifiers to obtain a combined set of information including entity information associated with the first plurality of entities, wherein the combined set of information does not include personally identifiable information; generate a plurality of microsegments based on at least one of (1) selected activities criteria and (2) selected characteristics criteria from the combined set of information; and receive, from a third party, a third set of information including characteristics attributable to a second plurality of entities, the third party having contact information for entities in the second plurality of entities. The processor is further configured to match characteristics in respective microsegments to characteristics of entities in the second plurality of entities to identify an audience of entities that have a propensity to carry out certain activities based on the selected activities criteria and/or selected characteristics criteria in forming the microsegments, to enable the third party to contact the audience to induce desired activities in at least a portion of the entities in the audience.

An exemplary method for generating anonymous microsegments includes retrieving, from a first source, a first set of information including activities attributable to a plurality of entities and first entity identifiers associated with respective entities, wherein the first entity identifiers are encrypted with a first encryption such that only the first source can identify the respective entities, and wherein the first set of information does not include personally identifiable information. The method further includes retrieving, from a second source, a second set of information including characteristics attributable to a plurality of entities and second entity identifiers associated with respective entities, wherein the second entity identifiers are encrypted with a second encryption such that only the second source can identify the respective entities, and wherein the second set of information does not include personally identifiable information. The method also includes combining the first set of information and the second set of information based on the first and second entity identifiers to obtain a combined set of information including activities and characteristics attributable to the first plurality of entities, wherein the combined set of information does not include personally identifiable information; and generating a plurality of microsegments, each microsegment including a group of entities, wherein every entity of the group of entities has at least one characteristic or activity in common, and wherein none of the microsegments in the plurality of microsegments have an entity in common.

An exemplary system for generating anonymous microsegments includes a receiving device configured to: retrieve, from a first source, a first set of information including activities attributable to a plurality of entities and first entity identifiers associated with respective entities, wherein the first entity identifiers are encrypted with a first encryption such that only the first source can identify the respective entities, and wherein the first set of information does not include personally identifiable information; and retrieve, from a second source, a second set of information including characteristics attributable to a plurality of entities and second entity identifiers associated with respective entities, wherein the second entity identifiers are encrypted with a second encryption such that only the second source can identify the respective entities, and wherein the second set of information does not include personally identifiable information. The system further includes a processor configured to: combine the first set of information and the second set of information based on the first and second entity identifiers to obtain a combined set of information including activities and characteristics attributable to the first plurality of entities, wherein the combined set of information does not include personally identifiable information; and generate a plurality of microsegments, each microsegment including a group of entities, wherein every entity of the group of entities has at least one characteristic or activity in common, and wherein none of the microsegments in the plurality of microsegments have an entity in common.

BRIEF DESCRIPTION OF THE DRAWING FIGURES

Exemplary embodiments are best understood from the following detailed description when read in conjunction with the accompanying drawings. Included in the drawings are the following figures:

FIG. 3 is a data set illustrating useable consumer data without including personally identifiable information in accordance with exemplary embodiments.

FIGS. 4A and 4B are data sets illustrating microsegments created from the data set of FIG. 3 in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Financial Transaction Processing System

Figure 1:
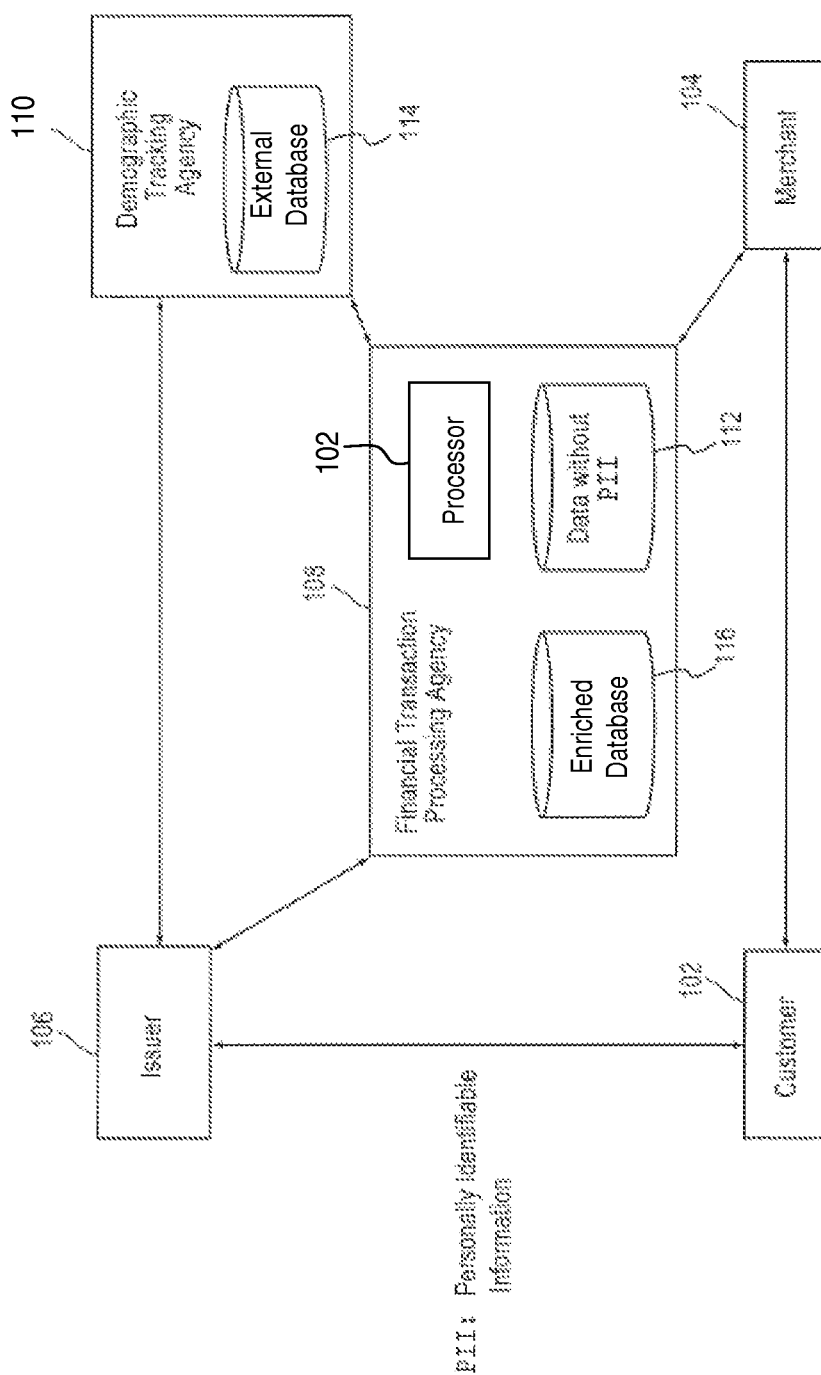
FIG. 1 is a block diagram illustrating a high-level view of system architecture of a financial transaction processing system in accordance with exemplary embodiments.

FIG. 1 illustrates a financial transaction processing system 100 including a customer (e.g., a consumer) 102, a merchant 104, an issuer 106, a financial transaction processing agency 108, and a demographic tracking agency 110.

The customer 102 may use a payment card at the merchant 104 for payment of a financial transaction. The payment card may be any type of transaction card used for making payments in a financial transaction, such as a debit card, credit card, charge card, ATM card, etc. Each payment card may be assigned a unique identifier (e.g., an account number) that links the payment card to a cardholder (e.g., the customer 102).

The merchant 104 may forward the payment card information (e.g., the account number) as well as transaction information (e.g., the amount, merchant information, time and date information, etc.) to the financial transaction processing agency 108 for processing. The financial transaction processing agency 108 may be any service provider for merchants, acquirers, issuers, consumers, etc. for the processing of transactions involving payment cards, such as MasterCard or VISA. The financial transaction processing agency 108 may issue an authorization request from the issuer 106. The issuer 106 may be an entity (e.g., a bank or the merchant 104) that issued the payment card used in the transaction, a stand-in processor configured to act on behalf of the issuer of the payment card, a credit bureau that has card or consumer related information, or any other suitable entity.

The issuer 106 may approve or deny the transaction. If the issuer 106 approves the transaction, the issuer 106 notifies the financial transaction processing agency 108 of the approval. The financial transaction processing agency 108 may then notify the merchant 104 of the approval of the transaction, who may then finalize the transaction with the customer 102. The issuer 106 may then bill the customer 102 for payment of the transaction and report any payments, or lack thereof, to the demographic tracking agency 110 (e.g., a credit report agency, a marketing and research firm such as Nielsen, etc.). The demographic tracking agency 110, therefore, may possess personally identifiable information (PII)

of the customer 102, which may be stored in the external database 114, though the financial transaction processing agency 108 would not be in possession of the PII or have access to it.

Personally Identifiable Information

Personally identifiable information (PII) may be information that may be used, alone or in conjunction with other sources, to uniquely identify a single individual (e.g., the customer 102). As such, there is a benefit to prevent the use and dissemination of PII in an effort to protect consumer privacy and to prevent against crimes, such as identity theft. The present disclosure provides for methods where the financial transaction processing agency 108 (e.g., MasterCard) does not possess any data containing personally identifiable information in processes that help accurately identify groups of individuals or businesses having particular interests or desires across a broad and diverse population of cardholders.

This is done, viewed at a high level, by enriched data associated with individuals or businesses (entities), to include transaction history and demographics, but not PII, as associated by a unique identifier, and placing like entities, filtered by some criteria, into small groups. Therefore, third parties that have contact information for entities can group them and match them to the enriched data groups. Whether or not the groups from the combined/enriched data sets and from the data sets have parity, common members, or no overlap, statistically the matched groups have predictable behavior, particularly in small groups or microsegments (as defined below). Having grouped the third party's data set members into small groups based on selected activities and/or characteristics (e.g., demographic and geographic information), the third party can effectively direct communications of interest to these small groups or microsegments. The third party may possess contact information, which may include PII, such as e-mail addresses, phone numbers, etc. In an exemplary embodiment, the contact information that may include PII may be removed from the third party data set or made otherwise unavailable to the financial transaction processing agency 108.

In some embodiments, bucketing may be used in order to render potentially identifiable information anonymous, such as by aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the financial transaction processing agency 108 may not possess the PII or be able to decrypt the encrypted PII.

Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc.

Protection of PII in a Financial Transaction Processing System

As illustrated in FIG. 1, the financial transaction processing agency 108 may include a database without PII 112 and an enriched database 116, which also does not include PII. The demographic tracking agency 110 may include the external database 114, which may include PII not accessible by the financial transaction processing agency 108.

The database without PII 112 may store information on a plurality of consumers (e.g., the customer 102) that is not personally identifiable. For example, the financial transaction processing agency 108 may store information relating to financial transactions processed by the agency as it performs in the system 100, such as transaction amount, transaction time, transaction location, merchant identification, etc. and do so without the use of any PII relating to the customer 102 participating in the transactions. In some embodiments, the database without PII 112 may store an encrypted unique identifier associated with a consumer, which may be encrypted using a one-way encryption, such that the financial transaction processing agency 108 may be unable to identify the associated consumer. Methods of encryption suitable for performing the functions as disclosed herein will be apparent to persons having skill in the relevant art.

The financial transaction processing agency 108 may communicate with the demographic tracking agency 110 (e.g., via a network such as the network 906, discussed below). The financial transaction processing agency 108 may obtain non-personally identifiable information from the external database 114. Non-personally identifiable information include in the external database 114 may include geographical data, demographic data, financial data, or any other suitable data as will be apparent to persons having skill in the relevant art, hereinafter referred to generally as demographic data. In one embodiment, the information included in the external database 114 may be bucketed and thus not personally identifiable. The financial transaction processing agency 108 may combine the non-personally identifiable information provided by the demographic tracking agency 110 with information included in the database without PII 112 into a single data set. The combined data set may be stored in the enriched database 116. In some embodiments, the financial transaction processing agency 108 may aggregate (e.g., bucket, group, etc.) data in each of the external database 114 and the database without PII 112 prior to combining the information into a single data set. In a further embodiment, the financial transaction processing agency 108 may aggregate data to a level of ten prior to combining the information into a single data set.

Each of the databases 112, 114, and 116 may be any type of database suitable for the storage of data as disclosed herein. Each database may store data in a single database, or may store data across multiple databases and accessed through a network. Network configurations as disclosed herein may include a local area network (LAN), a wide area network (WAN), a wireless network (e.g., WiFi), a mobile communication network, a satellite network, the Internet, fiber optic, coaxial cable, infrared, radio frequency (RF) or any other suitable configuration as would be apparent to persons having skill in the relevant art.

Data may be stored on any type of suitable computer readable media, such as optical storage (e.g., a compact disc, digital versatile disc, blu-ray disc, etc.) or magnetic tape storage (e.g., a hard disk drive). The database may be configured in any type of suitable database configuration, such as a relational database, a structured query language (SQL) database, a distributed database, an object database, etc. Suitable configurations and database storage types will be apparent to persons having skill in the relevant art.

The database without PII 112 and the enriched database 116 may be included as part of the financial transaction processing agency 108 internally, or externally and accessed through a network. The external database 114 may be included as part of the demographic tracking agency 110 internally, or externally and accessed through a network. Each database may be a single database, or may comprise multiple databases which may be interfaced together (e.g., physically or via a network, such as the network 906). In some embodiments, the database without PII 112 and the enriched database 116 may be a single database.

The financial transaction processing agency 108 may include a processor 102, which may be any type of processing device capable of performing the functions as disclosed herein, such as a general purpose computer, a general purpose computer configured as disclosed herein to become a specific purpose computer, etc. The processing device may be a single system (e.g., a single specific purpose computer) or may be comprised of several interconnected (e.g., physically or through a network) systems or servers (e.g., a server farm). The processor 102 may be coupled to each of the databases 112, 114, and 116 either physically (e.g., through a cable such as a coaxial cable, fiber-optic cable, etc.) or through a network (e.g., the network 906).

The processor 102 may be configured to receive information from both the database without PII 112 and to receive information with the PII removed from the external database 114, and to combine the data to form a combined data set without PII. In some embodiments, the processor 102 may aggregate the information received from at least one of the two databases prior to combining the information into the combined data set. The processor 102 may also be configured to store the combined data set (e.g., that does not include PII) in the enriched database 116. The processor 102 may be further configured to review the combined data set or to select microsegments or audiences based on the combined data set, as discussed in more detail below. In some embodiments, the processor 102 may be configured to review selected microsegments and/or audiences and generate reports therein.

Creation of Microsegments

Figure 2:
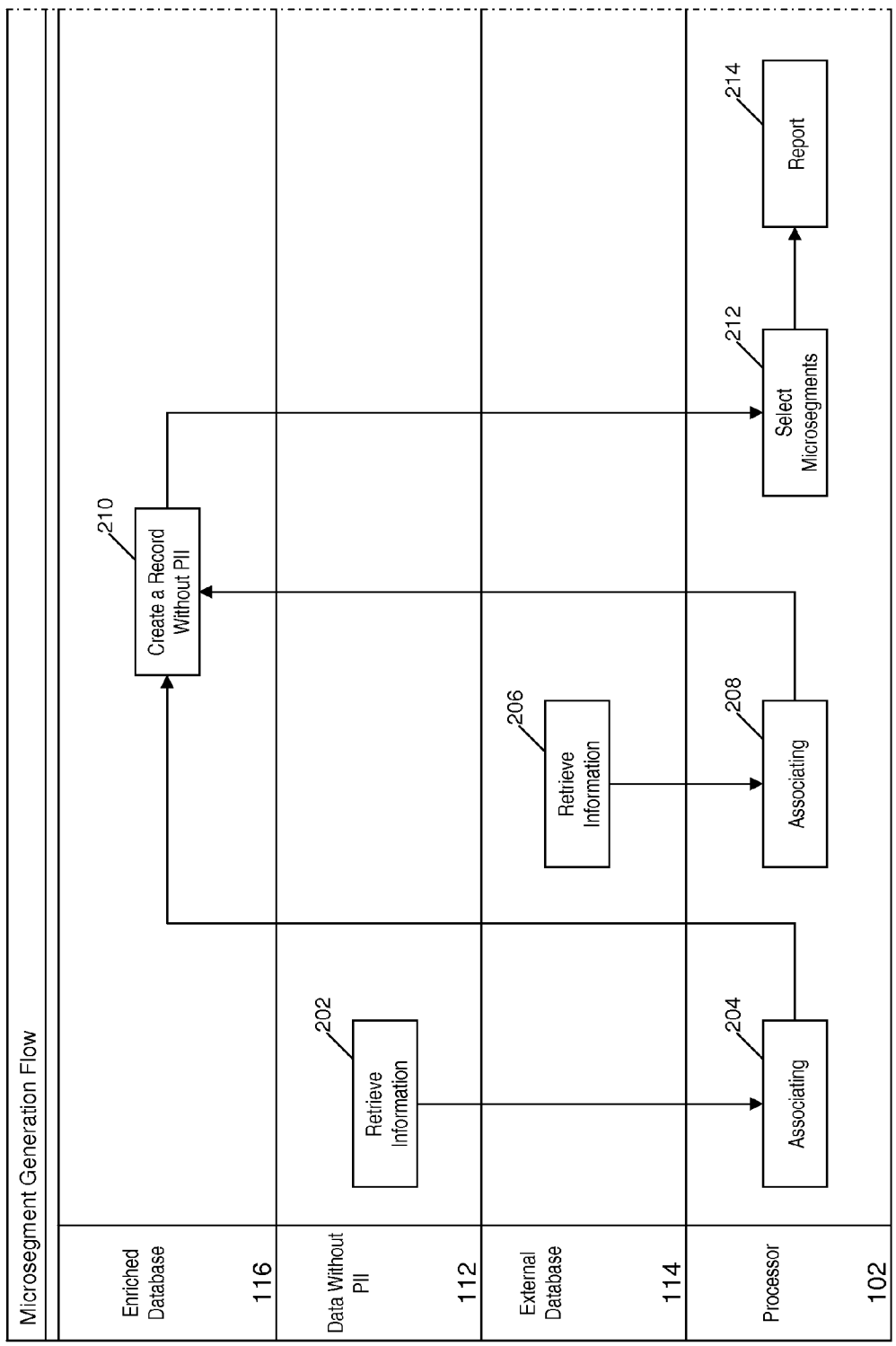
FIG. 2 is a flow chart illustrating a method for generating microsegments without the use of personally identifiable information in accordance with exemplary embodiments.

FIG. 2 illustrates a method for generating microsegments without the use of personally identifiable information. The method is disclosed with reference to the processor 102, the database without PII 112 and enriched database 116 as part of the financial transaction processing agency 108, and the external database 114 of the demographic tracking agency 110.

Information that is stored in the database without PII 112 may be retrieved (e.g., by the processor 102) in step 202. In one embodiment, all of the information stored in the database without PII 112 may be retrieved. In another embodiment, only a single entry in the database without PII 112 may be retrieved. The retrieval of information may be performed a single time, or may be performed multiple times. In an exemplary embodiment, only information pertaining to a specific microsegment (discussed further below) may be retrieved from the database without PII 112.

In step 204, the retrieved information may be associated with an entity (e.g., a cardholder, a business, a microsegment, any group or combination thereof, etc.) by the processor 102. In one embodiment, each entity may be represented by a unique identifier, such as a unique identification number (e.g., an account number). In one embodiment, entity information may be encrypted.

The processor 102 may retrieve, in step 206, information (e.g., that does not include any personally identifiable information) from the external database 114. The retrieval performed in step 206 may be of the same type and retrieve the corresponding information (e.g., relating to the same microsegment) as the information retrieved from the database without PII 112 in step 202. In one embodiment, if the external database 114 includes PII, the financial transaction processing agency 108 may be prohibited from accessing the PII. The information retrieved in this step may, in step 208, then be associated with an entity (e.g., the same entity from step 202). In step 210, a record may be created in the enriched database 116. The enriched database 116 may store the information obtained and associated in the prior steps, the information not containing any PII. As a result, the financial transaction processing agency 108 may not be in contact with or have access to any PII during the process.

Microsegments (as defined below) may be selected, in step 212, based on the information that was obtained and stored in the enriched database 116. The selection of information for representation in the microsegment or microsegments may be different in every instance. In one embodiment, all of the information stored in the enriched database 116 may be used for selecting microsegments. In an alternative embodiment, only a portion of the information may be used. The selection of microsegments may be based on specific criteria (e.g., from a research firm or advertising agency).

In step 214, information may be reported by the processor 102. Reporting may include the review and/or reporting of the selected microsegments, of the information stored in the enriched database 116, or a combination thereof. Reviewing may include a review of financial account information of the entities in the microsegments, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

The report may be transmitted to a third party (e.g., a requesting advertiser) or the financial transaction processing agency 108, may be displayed (e.g., on a display device), or may be reported in any other manner suitable for reporting. The reporting may include a report on a review of the selected microsegments or information, or any other suitable information, such as an analysis of the review (e.g., and performed by the financial transaction processing agency 108). Reporting may be performed visually, aurally, tactically, or in any other suitable method as will be apparent to persons having skill in the relevant art.

Microsegment Definition and Creation

A microsegment is a representation of a group of consumers that is granular enough to be valuable to advertisers, marketers, etc., but still maintain a high level of consumer privacy without the use or obtaining of any personally identifiable information.

Microsegments may be given a minimum or a maximum size. A minimum size of a microsegment would be at a minimum large enough so that no entity could be personally identifiable, but small enough to provide the granularity needed in a particular circumstance. In some instances, the size of a microsegment may be dependent on the application. An audience based on a plurality of microsegments, for instance, might have ten thousand entities, but the microsegments would be aggregated when forming the audience and would not be discernable to anyone having access to an audience. As noted elsewhere, the entities in a microsegment that is used to form an audience might not be members of a resulting audience at all. In one embodiment, a microsegment may include at least ten unique entities. Microsegments may be defined based on geographical or demographical information, such as age, gender, income, marital status, postal code, income, spending propensity, familial status, etc. Categories may be bucketed to avoid the use of PII (e.g., representing age by a range of ages). In some embodiments, microsegments may be defined by a plurality of geographical and/or demographical categories. For example, a microsegment may be defined for any cardholder with an income between $50,000 and $74,999, that is between the ages of 20 and 29, and is single.

In this way, microsegments may be defined in such a way as to avoid the use of PII. For example, if a preliminary microsegment is defined for entities with an income between $100,000 and $149,999 in a particular postal code, and the preliminary microsegment contains less than a minimum number (e.g., as provided by the advertiser, governmental regulations, etc.) of entities, the preliminary microsegment may be combined with another microsegment (e.g., one corresponding to a neighboring postal code) as to further protect the personal identity of the entities in the preliminary microsegment. In this way, microsegments will be defined in a way so that no entity in any microsegment is personally identifiable.

Microsegments may also be based on behavioral variables. For example, the database without PII 112 may store information relating to financial transactions. The information may be used to determine an individual's likeliness to spend. An individual's likeliness to spend may be represented generally, or with respect to a particular industry (e.g., electronics), retailer (e.g., Macy's®), brand (e.g., Apple®), or any other criteria which may be suitable as will be apparent to persons having skill in the relevant art. An individual's behavior may also be based on additional factors such as time, location, season, etc. For example, a microsegment may be based on consumers who are likely to spend on electronics during the holiday season, or on consumers whose primary expenses are in a suburb, but are likely to spend on restaurants located in a major city. The factors and behaviors identified and used to define microsegments may vary widely and may be based on the application of the information.

Behavioral variables may also be applied to generated microsegments based on the attributes of the entities in the microsegment. For example, a microsegment of specific geographical and demographical attributes (e.g., single males in a particular postal code between the ages of 26-30 with an income between $100,000 and $149,999) may be analyzed for spending behaviors. Results of the analysis may be assigned to the microsegment. For example, the above microsegment may be analyzed and reveal that the entities in the microsegment have a high spending propensity for electronics and may be less likely to spend money during the month of February.

FIG. 3 illustrates consumer information data that may be used in the creation of a microsegment. The data represented in the six leftmost columns may be information that is stored in the external database 114 at the demographic tracking agency 110, with any included PII removed or made otherwise inaccessible to the financial transaction processing agency 108 or the processor 102, in order to protect consumer privacy. The data represented in the six rightmost columns may be information that is stored in the financial transaction processing agency 110 database without PII 112.

In the illustrated embodiment, there is a unique identifier for each consumer that has been encrypted in order to protect the anonymity of the consumer.

The data from the external database 114 and the data from the database without PII 112 may be combined into a single set of data that does not contain PII, which may be stored in the enriched database 116. Information may be combined by use of the unique encrypted identifier for each entity. In one embodiment, if only one set of data contains a particular identifier, then that data may be left out of the enriched data set. In some embodiments, only some of the columns of data may be included in the enriched data set. For example, the marital status column may not be included (e.g., because the advertiser does not distinguish consumers based on marital status).

The enriched data set may be stored in the enriched database 116. The enriched data may be separated into a plurality of microsegments, with each microsegment being defined by at least one geographical or demographical limitation. FIG. 4A illustrates the data set of individuals in a microsegment MS1, one of a plurality of microsegments illustrated in FIG. 4B. Microsegment MS1 includes seven individuals, each with a unique encrypted identifier. As illustrated in FIG. 4B, microsegment MS1 is defined by individuals in age group C, income group B, with marital status B, and living in postal code 12345. Groupings (e.g., age group C) are defined in bucketed groups in such a manner as to not divulge any personally identifiable information. In this way, consumers of an ideal age may be placed into a microsegment (e.g., for advertising) without the financial transaction processing agency 108 knowing the actual age of the consumer or even a range of ages, and therefore protecting the privacy of the consumer. The corresponding values for the grouping (e.g., ages 25 to 34 corresponding to age group C), may not be available to the financial transaction processing agency 108.

As illustrated in FIG. 4B, preliminary microsegment MS4 only contains a single individual. As a result, preliminary microsegment MS4 may be combined with another microsegment in order to protect the privacy of that individual. For example, preliminary microsegment MS4 may be combined with microsegment MS1, because preliminary microsegment MS4 is defined by the same age, income, and marital groups, and the defined postal code is a neighboring postal code. It will be apparent to persons having skill in the relevant art that microsegments may be grouped or combined in any manner that may be suitable for the particular application. For example, a retailer may want to advertise to everyone in a particular postal code without regard for age or income, and therefore may desire to combine microsegment MS1 and microsegment MS3, whereas another retailer may want to advertise to a specific age group without regarding for other factors, and therefore would want to combine microsegments MS1, MS2, and MS4.

Exemplary Dataset of Microsegments

Figure 5:
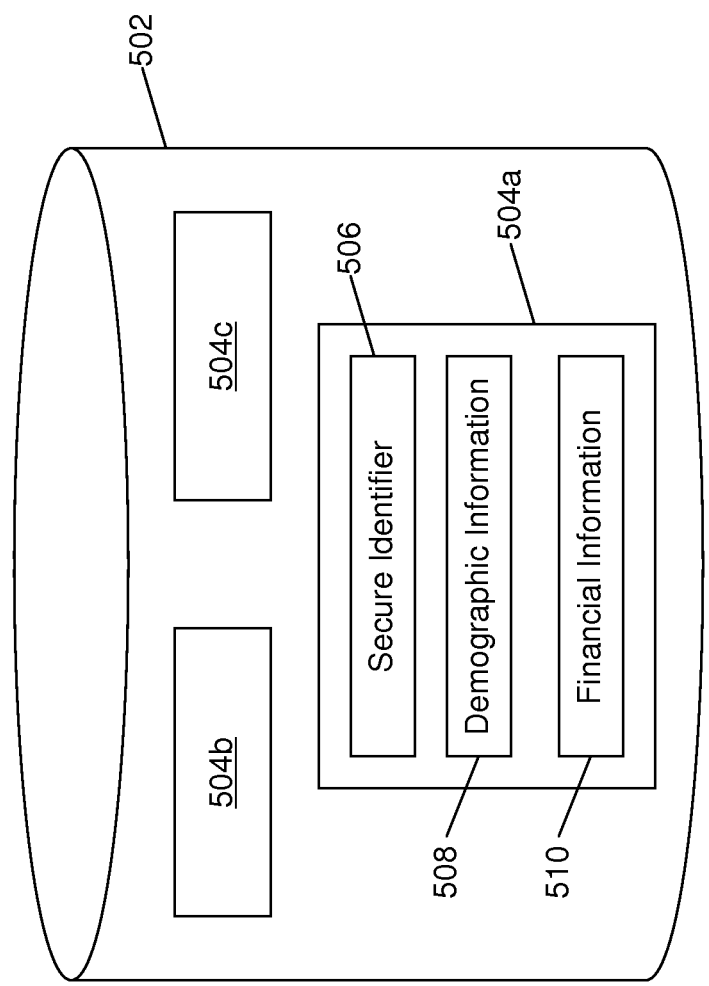
FIG. 5 is a block diagram illustrating a data set for use with the disclosed methods in accordance with exemplary embodiments.

FIG. 5 illustrates an exemplary dataset 502 for the storing, reviewing, and/or reporting of a plurality of microsegments. In one embodiment, the dataset 502 may be reported in the reporting step 214 of FIG. 2.

The dataset 502 may contain a plurality of entries (e.g., entries 504a, 504b, and 504c). Each entry of the plurality of entries may include a secure identifier 506, demographic information 508, and financial information 510. The secure identifier 506 may include any type of identifier that may be unique to the particular entry (e.g., entry 504a). The secure identifier may be encrypted. Suitable encryption methods may include public key encryption, RSA encryption, XOR encryption, SHA-2 encryption, symmetric key encryption, etc. In an exemplary embodiment, the secure identifier may be encrypted using a one-way encryption process. The secure identifier may be encrypted in such a way as to make any PII unavailable to the financial transaction processing agency 108.

The demographic information 508 may include any demographic, geographic, or other suitable information relevant to the particular application. For example, if a family restaurant is launching an advertising campaign and is requesting microsegments of families with a spend propensity on restaurants, then the demographic information may include familial status, but not age. If a bar is launching an advertising campaign, then demographic information may include age, but not familial status. In some embodiments, the demographic information 808 may be replaced by geographic or other information. Suitable types of information relevant for the selecting and supplying of microsegments will be apparent to persons having skill in the relevant art. Likewise, the financial information 510 may include any financial information relevant to the particular application. For example, a dataset provided to advertisers in the food service industry may contain entries with financial information that includes a spend propensity for restaurants, but not a spend propensity for electronics.

System for the Distribution of Audiences to a Third Party

Figure 6:
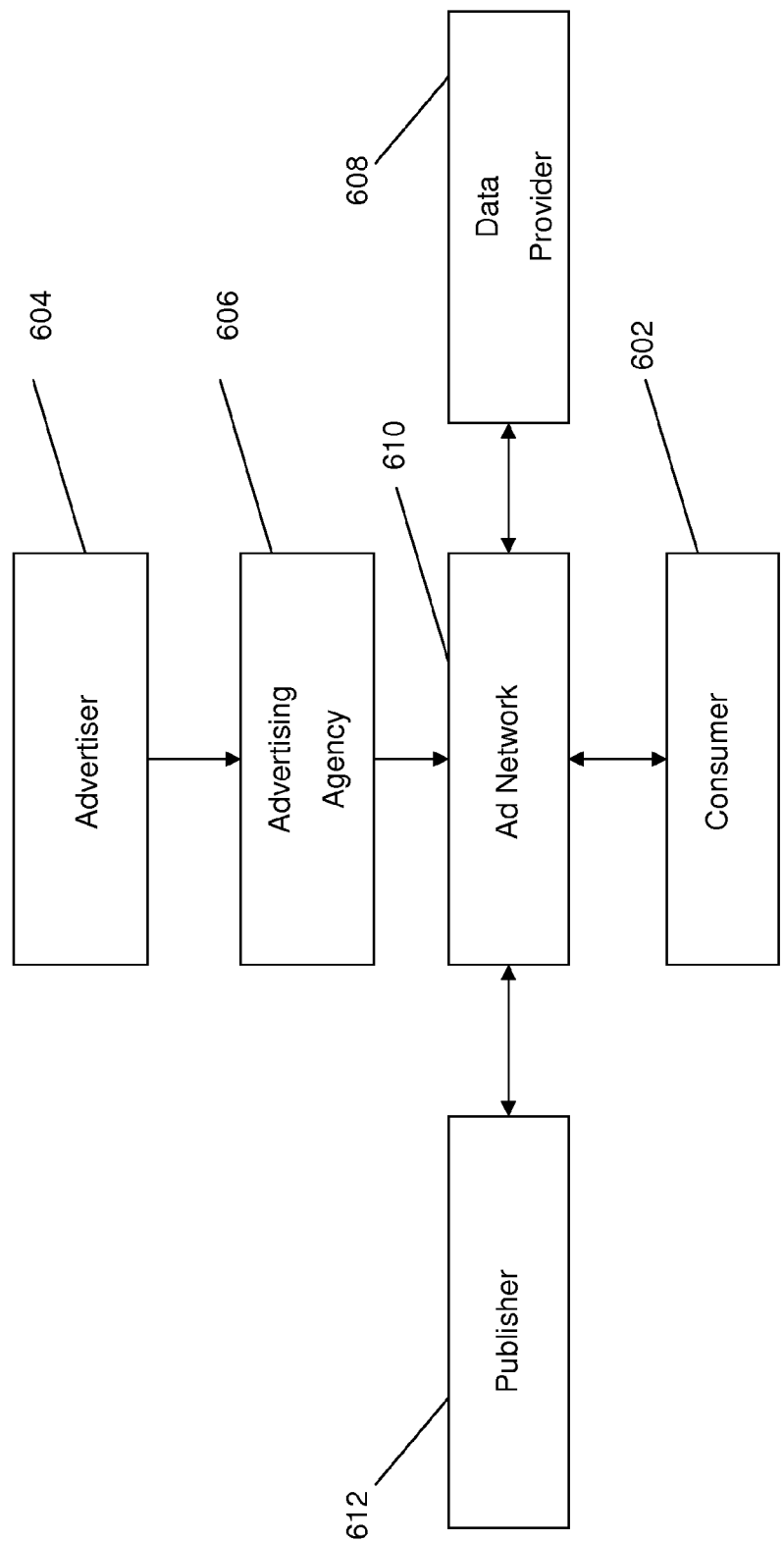
FIG. 6 is a block diagram illustrating a system for the distribution of audiences to a third party requester.

FIG. 6 illustrates a system architecture for the distribution audiences to a third party. The system may include an advertiser 604 (e.g., the merchant 104) who wishes to advertise to an ideal consumer. For example, a sporting goods store may wish to advertise to sports enthusiasts, a family restaurant may wish to advertise to families with a spend propensity for restaurants, or a landscaping service may wish to advertise to new homeowners. The advertiser 604 may contact an advertising agency 606 in their efforts to reach their ideal consumers.

The advertising agency 606 may refine the ideal market of consumers on behalf of the advertiser 604. For example, the advertising agency 606 may refine the family restaurant's ideal family with a spend propensity for restaurants to be a more specific ideal consumer, such as a family of at least three members above the age of 12, with an income between $30,000 and $59,999, living in eight possible postal codes near the restaurant, and with a spend propensity for restaurants. The advertising agency 606 may also develop campaigns or create a plan for advertising on behalf of the advertiser 604, or originate offers on behalf of, or with, the advertiser 604. The nature of the work of an advertising agency will be apparent to persons having skill in the relevant art.

The advertising agency 606 may provide an ad network 610, or other third party provider, with information regarding the advertising campaign, such as attributes of the refined ideal consumer or offers the advertiser 604 is interested in distributing to its ideal consumer. The ad network 610 may contact a data provider 608 (e.g., the financial transaction processing agency 108) and may provide the data provider 608 with any information necessary for the creation of audiences or microsegments that represent the ideal consumer of the advertiser 604. The data provider 608 may utilize methods as disclosed herein and provide the ad network 610 with a report (e.g., of ideal consumer microsegments or audiences). The ad network 610 may also contact a publisher 612. The publisher 612 may run a website or otherwise have advertising space available. The publisher 612 may make the advertising space available to the ad network 610, who may run advertisements or display offers through the publisher 612 and to the consumer 602 (e.g., the customer 102).

The ad network 610, or other third party provider, may also obtain data on the success or other parameters of the advertising or offers displayed to the consumer 602. The ad network 610 may provide this data to the data provider 608. The data provider 608 may apply the data received from the ad network 610 to selected microsegments to generate an audience, which may be provided to the ad network 610 The ad network 610 may also provide this information or any received audiences to the advertising agency 606 and/or the advertiser 604 (e.g., to inform of the success or failure of the advertising campaign).

Audiences

Figure 7:
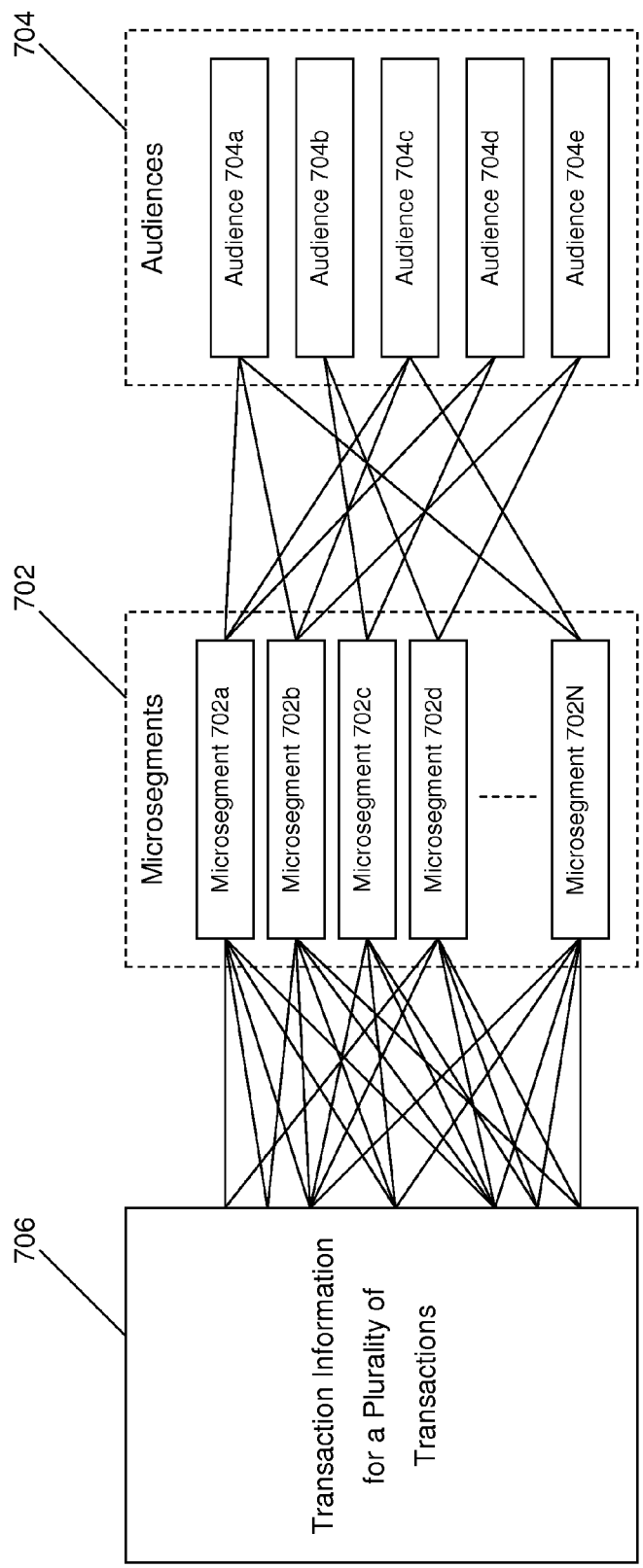
FIG. 7 is a block diagram illustrating the creation of microsegments and audiences from transaction information in accordance with exemplary embodiments.

FIG. 7 illustrates the creation of a plurality of audiences 704 from a plurality of microsegments 702, which are themselves created based on transaction information for a plurality of transactions 706.

Audiences may be a combined group of microsegments that may be applied to an external set of data (e.g., provided by a third party such as the ad network 610). For example, an audience may consist of a plurality of microsegments corresponding to geographical and demographical data provided by the merchant 104 (e.g., for the purposes of advertising), as applied to the external data set by matching characteristics in respective microsegments to characteristics of entities in the second plurality of entities to identify an audience of entities that have a propensity to carry out certain activities based on the selected activities criteria and/or selected characteristics criteria used in forming the microsegments, to enable the third party to contact the audience of entities to induce desired activities in at least a portion of the entities in the audience. In a further example, if the external set of data includes a plurality of postal codes (e.g., corresponding to the geographic area surrounding the merchant 104), the audience may consist of all microsegments for the plurality of postal codes. In some embodiments, an audience may consist of a group of microsegments that do not share any common parameters. Audience parameters or attributes may be based on attributes received (e.g., from a third party advertiser). It will be apparent to persons having skill in the relevant art that the number of potential audiences for a group of microsegments may be as large or larger than the group of microsegments itself. An audience may also be a combined grouping of entities, such as a group of entities identified by a third party, which may be matched to a group of microsegments in order to identify potential activities characteristics of the entities in the audience based on activities and/or characteristics data of the corresponding microsegments.

As illustrated in FIG. 7, and discussed above, the plurality of microsegments 702 may be created based on the transaction information of the plurality of transactions 706. The plurality of transactions 706 may consist of potentially billions of transactions, the information for which may be utilized in the creation of the plurality of microsegments 702. The transaction information may be obtained by the financial processing tracking agency 108, and may be stored in the database without PII 112.

The transaction information used for the creation of microsegments may be selected based on attributes (e.g., received from a third party advertiser). The financial transaction processing agency 108 (e.g., the data provider 1108) may select particular financial transactions or financial accounts for the creation of microsegments. The financial processing tracking agency 108 may create a plurality of microsegments 702, which may include microsegment 702a, microsegment 702b, and up to a microsegment 702N, where N may represent the total number of the microsegments in the plurality of microsegments 702.

The financial transaction processing agency 108 may create the plurality of audiences 704 based on the plurality of microsegments 702 as applied to a received external data set. The number of audiences in the plurality of audiences 704 may be at least as large as the number of microsegments in the plurality of microsegments 702. In an exemplary embodiment, the number of audiences is less than the number of microsegments. In FIG. 7, the plurality of audiences 704 is illustrated as including five audiences, audiences 704a-704e (e.g., based on five different sets of external data). Each audience may be comprised of multiple microsegments. For example, audience 704a may include microsegments 702a, 702b, and 702N. Each of the multiple microsegments in the audience may have a common parameter. For instance, the microsegments 702a, 702b, and 702N that comprise audience 704a may each be defined by the same postal code, or same age group, or both. The parameters used in the creation of audiences may be based on the goal of the audience creation (e.g., the advertisings goals of a third party advertiser).

Audiences may represent a wide variety of categories and attributes. In one embodiment, audiences may be created based on spending propensity of spending index in a particular industry. Industries may include, as will be apparent to persons having skill in the relevant art, restaurants (e.g., fine dining, family restaurants, fast food), apparel (e.g., women's apparel, men's apparel, family apparel), entertainment (e.g., movies, professional sports, concerts, amusement parks), accommodations (e.g., luxury hotels, motels, casinos), retail (e.g., department stores, discount stores, hardware stores, sporting goods stores), automotive (e.g., new car sales, used car sales, automotive stores, repair shops), travel (e.g., domestic, international, cruises), etc. Each industry may include a plurality of audiences (e.g., based on location, income groups, etc.).

Audiences may also be based on predictions of future behavior. For instance, an entity (e.g., the financial transaction processing agency 108) may analyze financial account information and behavioral information (e.g., stored in the enriched database without PII) to predict future behavior of a microsegment of entities. For example, the financial transaction processing agency 108 may determine that entities in microsegment 702a have a high spending propensity for electronics. An audience (e.g., the audience 704a) may consist of all microsegments (e.g., the microsegments 702a, 702b, and 702N) which contain entities with a high spending propensity for electronics.

Audiences may also be aligned with other similar audiences. Similar audiences may be determined by similarities in, for example, the audience parameters (e.g., nearby postal codes), or in the entities contained in the microsegments (e.g., a larger number of cardholders common to both audiences). In one embodiment, the financial transaction processing agency 108 may create audiences based on received parameters, which may be aligned to audiences created by a third party (e.g., the demographic tracking agency 110) on the same parameters yet include different entities or microsegments. The process and parameters for the alignment of audiences may be dependent on the application of the audiences, as will be apparent to persons having skill in the relevant art.

Maintaining Privacy in Microsegment Creation and Application

Figure 8A:
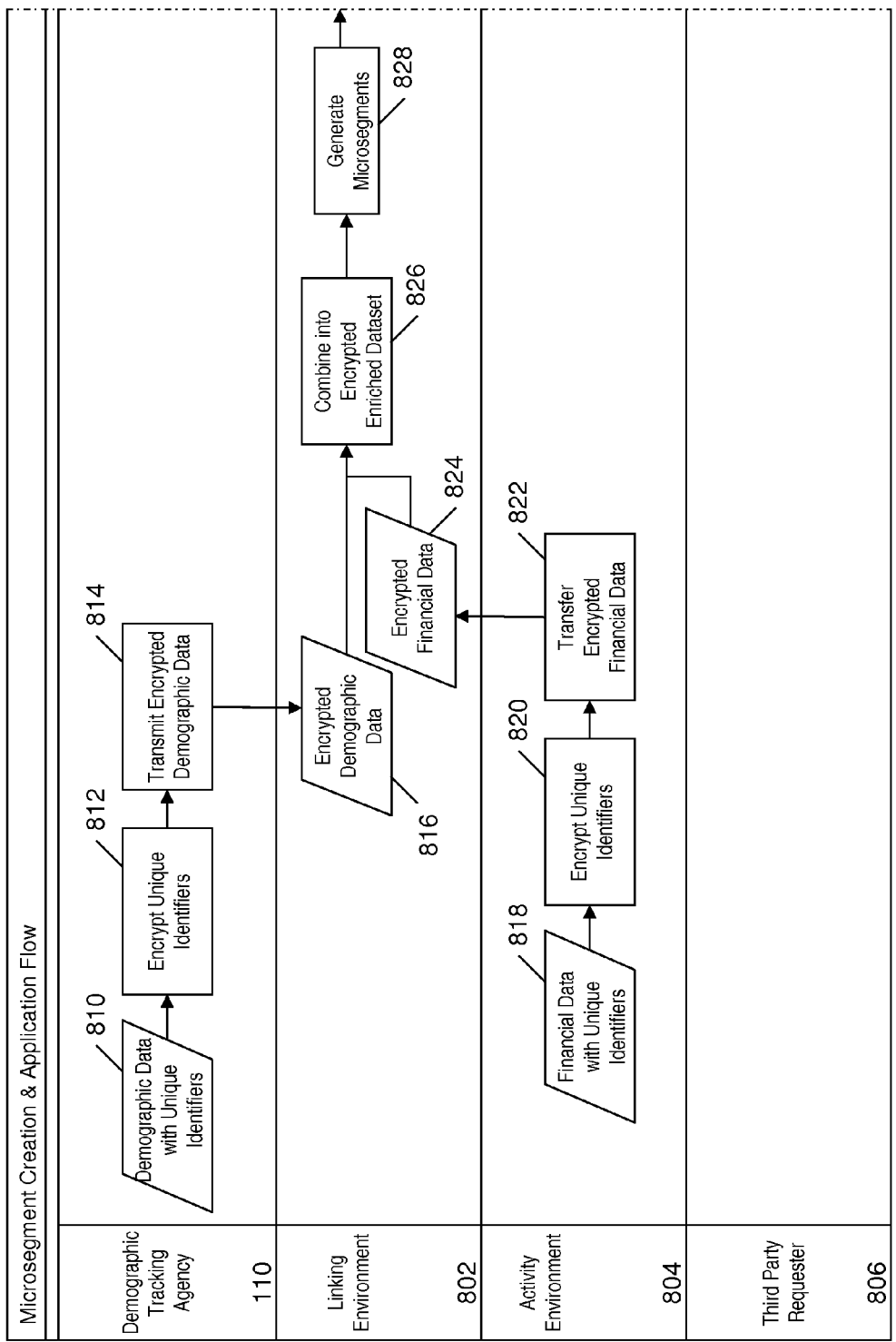
FIGS. 8A and 8B are a flow diagram illustrating an exemplary method for generating and analyzing microsegments and applying the analysis in accordance with exemplary embodiments.
Figure 8B:
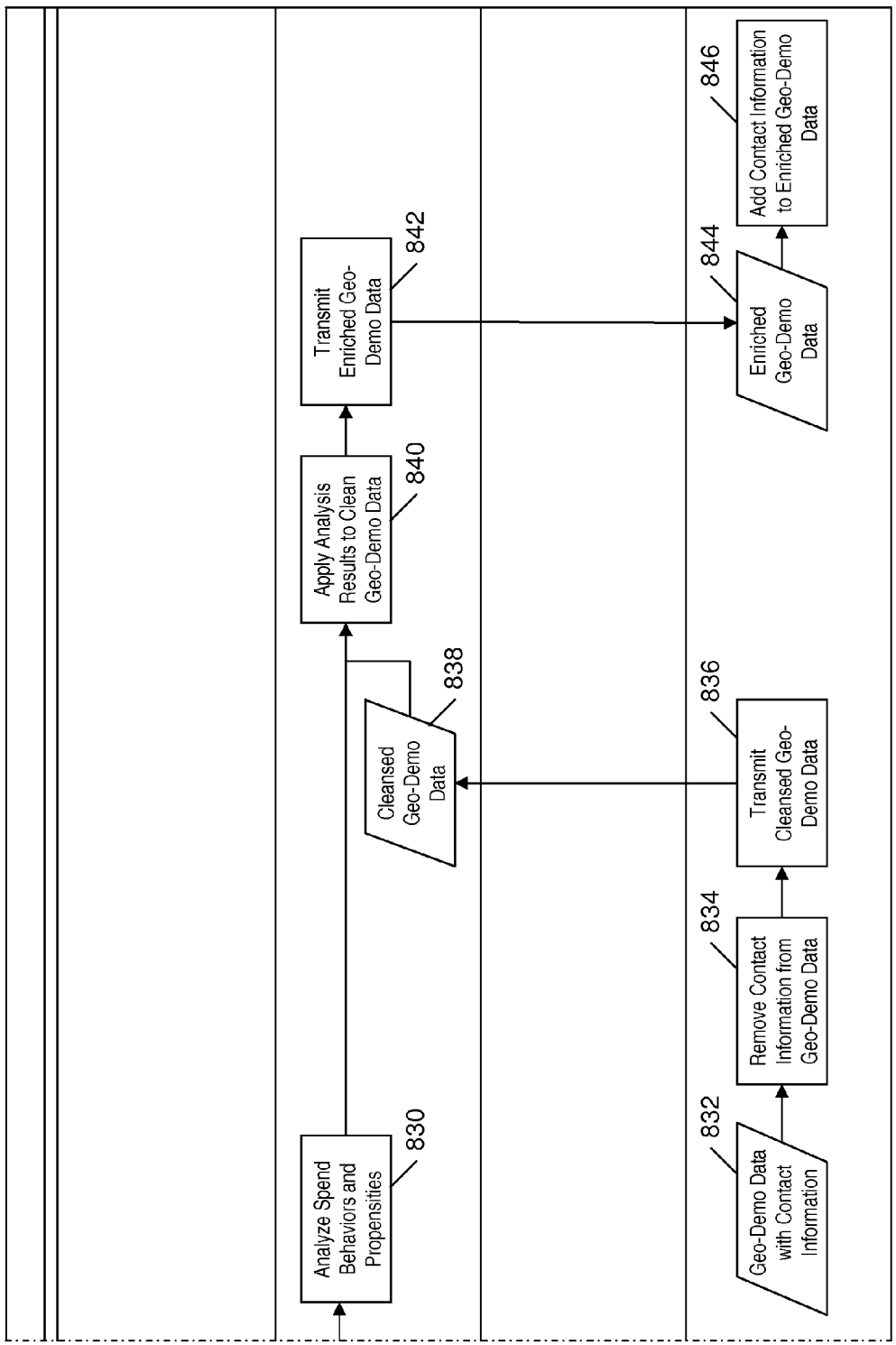

FIGS. 8A and 8B illustrate a process for maintaining consumer privacy in the creation, analysis, and application of microsegments. The process may include the demographic tracking agency 110, which may provide demographic, geographical, financial, or other types of desired information, and a third party requester 806, which may request an application of microsegment analysis applied to provided entities, such as the ad network 600 or other third party. The process may also utilize a linking environment 802 and an activity environment 804, both of which may be a part of a single entity, such as the financial transaction processing agency 108.

The linking environment 802 and the activity environment 804 may be separated in such a manner as to maintain the protection of all potentially personally identifiable information as discussed herein. Users of the activity environment 804 may be unable to access the linking environment 802 and vice versa.

In step 810, account data (e.g., demographic data) may be stored by the demographic tracking agency 110 (e.g., in the external database 114), the data including unique identifiers for a plurality of entities (e.g., cardholders). In some embodiments, the demographic tracking agency 110 may possess personally identifiable data, which may be stored locally (e.g., in the external database 114) or externally and accessed via a network. In step 812, the demographic tracking agency 110 may encrypt the unique identifiers using encryption. In an exemplary embodiment, the first encryption is a one-way encryption such that other entities (e.g., the linking environment 802 or the financial transaction processing agency 108) are unable to access any personally identifiable information.

In step 814, the data (e.g., the demographic data) with unique identifiers encrypted may be transmitted to the linking environment 802, which, in step 816, may be received by the linking environment 802 and stored. The unencrypted unique identifier may not be included in the provided data, which prevents the financial transaction processing agency 108 from being able to identify PII. The encrypted demographic data may remain in the linking environment 802 and be unavailable and inaccessible to the activity environment 804 in the financial transaction processing agency 108.

In step 818, financial data (e.g., transaction information) associated with a plurality of entities (e.g., cardholders) including unique identifiers may be stored by the activity environment 808. In an exemplary embodiment, the financial data does not include personally identifiable information. In step 820, the activity environment 804 may encrypt the unique identifiers. In an exemplary embodiment, the encryption is a one-way encryption process.

In step 822, the activity environment 804 may transfer the encrypted data (e.g., the financial data) to the linking environment 802, which may receive and store (e.g., in the database without PII 112) the data in step 824. In step 826, the linking environment 802 may combine the demographic data and the financial data into a single data set (e.g., an enriched data set). In one embodiment, the linking environment 802 may aggregate the encrypted demographic data and the encrypted financial data prior to combining the data into a single data set. In a further embodiment, the demographic and financial data may be aggregated to a level of ten prior to combining into a single data set. The linking environment 802 may store (e.g., in the enriched database 116) the enriched data set. Methods of combining the encrypted demographic data and encrypted financial data into a single data set will be apparent to persons having skill in the relevant art.

In step 828, the linking environment 802 may generate a plurality of microsegments. In some embodiments, each microsegment may include at least ten entities, which each may have at least one attribute in common. In an exemplary embodiment, the generating of microsegments may include generating microsegments based on the following attributes: postal code, bucketed age group, bucketed income group, presence of children, and gender indicator. Any microsegment with less than a given number (e.g., ten) entities may be deleted from the plurality of microsegments, which may result in significantly fewer microsegments.

In step 830, the linking environment 802 may analyze the generated microsegments (e.g., by analyzing the stored data for each entity comprising the microsegment) for behavioral information (e.g., spend behaviors and propensities). In some embodiments, the behavioral information may be represented by a behavioral score. Behavioral information may be assigned to each corresponding microsegment, or may be assigned to an audience of microsegments.

In step 832, geo-demo (e.g., geographical and demographical) data with contact information for a plurality of entities may be stored by the third party requester 806. In one embodiment, at least one entity identified by the third party requester 806 may be different from the plurality of entities used in the generation of microsegments by the linking environment 802 in step 828. For example, the linking environment 802 may only have data for cardholders with accounts with the financial transaction processing agency 108, but the third party requester 806 may request behavioral information for entities who do not have accounts with the financial transaction processing agency 108.

In step 834, the third party requester 806 may remove all contact information (e.g., any information that may be personally identifiable) from the geographical-demographical data. The third party requester 806 may then, in step 836, transmit the cleansed geographical-demographical data to the linking environment 802. In an exemplary embodiment, the third party requester 1306 may include entity identification information (e.g., user identification numbers) in the cleaned geographical-demographical data. The linking environment 1302 may receive the cleansed data, in step 838, and may store the data. In some embodiments, the third party requester 806 may include in the transmission a request for specific behavioral information (e.g., spend propensities for a particular industry) as applied to the provided geographical-demographical data.

In step 840, the linking environment 802 may apply the analysis performed in step 830 to the cleansed geographical-demographical data. The application of the analysis may include, for each entity in the geographical-demographical data, matching the entity to one of the plurality of generated microsegments based on the geographical and demographical attributes, and applying the behavioral information assigned to that generated microsegment to the entity (e.g., resulting in an enriched entity). In step 842, the linking environment 802 may transmit the enriched geographical-demographical data (e.g., with applied behavioral information) back to the third party requester 806. The third party requester 806 may, in step 844, receive the data. In step 846, the third party requester 806 may add the contact information (e.g., that was removed in step 834) to the enriched geographical-demographical data (e.g., for advertising purposes).

Microsegments or behavioral information may be updated or refreshed at a specified time (e.g., on a regular basis, upon request of the third party requester 806, etc.). Updating microsegments may include updating the entities included in each microsegment, such as by repeating steps 810 through 828 with updated demographic data (e.g., in step 810) and/or updated financial data (e.g., in step 818). Microsegments may also be updated by changing the attributes that define each microsegment, such as by repeating step 828 using the original combined data set, but generating a different set of microsegments.

The process for updating behavioral information may depend on the circumstances regarding the need for the information itself. For example, if a request is for a previously unrequested spending behavior, which may be performed on the original data, only step 830 may be repeated. If a request is for the same spending behavior, but as performed on updated financial data, then only steps 818 to 830 may need to be repeated. In some instances, the entire process (e.g., steps 810 to 830) may need to be repeated to update the behavioral information.

Exemplary Method of Generating Microsegments of a Population of Entities

Figure 9:
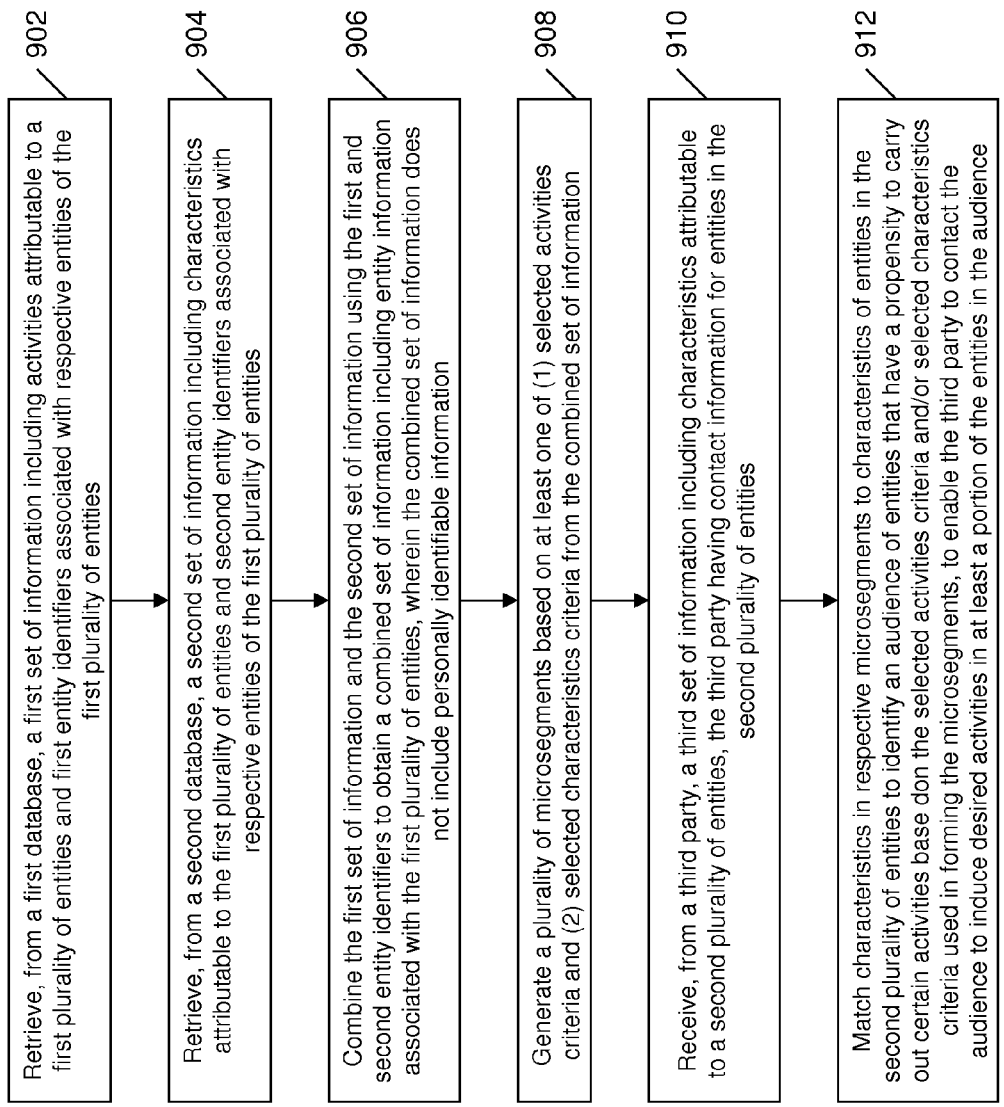
FIG. 9 is a flow chart illustrating an exemplary method for generating audiences of a population of entities without the use of personally identifiable information.

FIG. 9 illustrates a method of generating audiences of a population of entities.

In step 902, a processing agency (e.g., the financial transaction processing agency 108) may retrieve, from a first database (e.g., the database without PII 112), a first set of information including activities attributable to a first plurality of entities and first entity identifiers associated with respective entities of the first plurality of entities. In one embodiment, the activities may include financial transactions associated with the first plurality of entities. In a further embodiment, the activities may include behavioral information related to the financial transactions, such as spending propensities (e.g., in a particular industry, at a particular merchant, etc.), likelihood to spend, or other behaviors. In one embodiment, the first set of entity identifiers may be encrypted (e.g., with a one-way encryption) as to render the entity identifiers non-personally identifiable. In an exemplary embodiment, the first set of information does not include any personally identifiable information.

In step 904, the financial transaction processing agency 108 may retrieve, from a second database (e.g., the external database 114), a second set of information including characteristics attributable to the first plurality of entities and second entity identifiers associated with respective entities of the first plurality of entities. In some embodiments, the characteristics may include geographical and demographical characteristics attributable to the first plurality of entities. In one embodiment, the second entity identifiers may be encrypted (e.g., with a one-way encryption) as to render the entity identifiers non-personally identifiable. In an exemplary embodiment, the first entity identifiers and the second entity identifiers may have at least one entity identifier in common. In a further embodiment, the first and second entity identifiers may have all entity identifiers in common.

In step 906, the financial transaction processing agency 108 may combine the first set of information and the second set of information using the first and second entity identifiers to obtain a combined set of information (e.g., such as the data in the enriched database 116) including entity information associated with the first plurality of entities, wherein the combined set of information does not include personally identifiable information. In one embodiment, the entity information may include the activities and characteristics attributable to the first plurality of entities.

In step 908, the financial transaction processing agency 108 may generate a plurality of microsegments based on at least one of (1) selected activities criteria and (2) selected characteristics criteria from the combined set of information. In an exemplary embodiment, each microsegment may include at least ten entities. In a further embodiment, the selected characteristics criteria may be based on characteristics attributable to each of the at least ten entities included in the microsegment. In another embodiment, all of the at least ten entities may include at least one attributed characteristic in common.

In step 910, the financial transaction processing agency 108 may receive, from a third party (e.g., the ad network 1110), a third set of information including characteristics attributable to a second plurality of entities, the third party having contact information for entities in the second plurality of entities. In one embodiment, the first plurality of entities and the second plurality of entities may or may not have common entities. In an exemplary embodiment, the third set of information may not include the contact information for entities in the second plurality of entities. In another exemplary embodiment, the characteristics attributable to the second plurality of entities and the characteristics attributable to the first plurality of entities may include the same characteristics.

In step 912, the financial transaction processing agency 108 may match characteristics in respective microsegments to characteristics of entities in the second plurality of entities to identify an audience of entities that have a propensity to carry out certain activities based on the selected activities criteria and/or selected characteristics criteria used in forming the microsegments, to enable the third party to contact the group to induce desired activities in at least a portion of the entities in the audience. In one embodiment, matching the characteristics in respective microsegments may include matching all of the characteristics of entities in the second plurality of entities with characteristics of the respective microsegments. In an embodiment, with respect to entities having a propensity to carry out certain activities, the certain activities may be defined by the third party (e.g., and received in step 1408 along with the third set of information). In one embodiment, the certain activities may include the desired activities. In yet another embodiment, the audience may contain at least one entity.

In an exemplary embodiment, the method illustrated in FIG. 9 may be performed in real-time. For example, a user (e.g., the consumer 102) may navigate to a website (e.g., published by the publisher 1112), with advertising space controlled by the third party (e.g., the ad network 1110). The third party may provide demographic information of the user to the financial transaction processing agency 108, who may then apply the demographic information to the generated microsegments to match the user to a microsegment. The financial transaction processing agency 108 may identify spending behaviors and propensities based on the activities associated with the entities in the microsegment, and may report the spending behaviors and information to the third party. The third party may then select an appropriate advertisement to display to the user when the website is displayed. In some instances, the third party may provide demographic information of multiple users at the same time, or may bucket the demographic information of the user, in order to render the information not personally identifiable.

Exemplary Method for the Generation of Anonymous Microsegments

Figure 10:
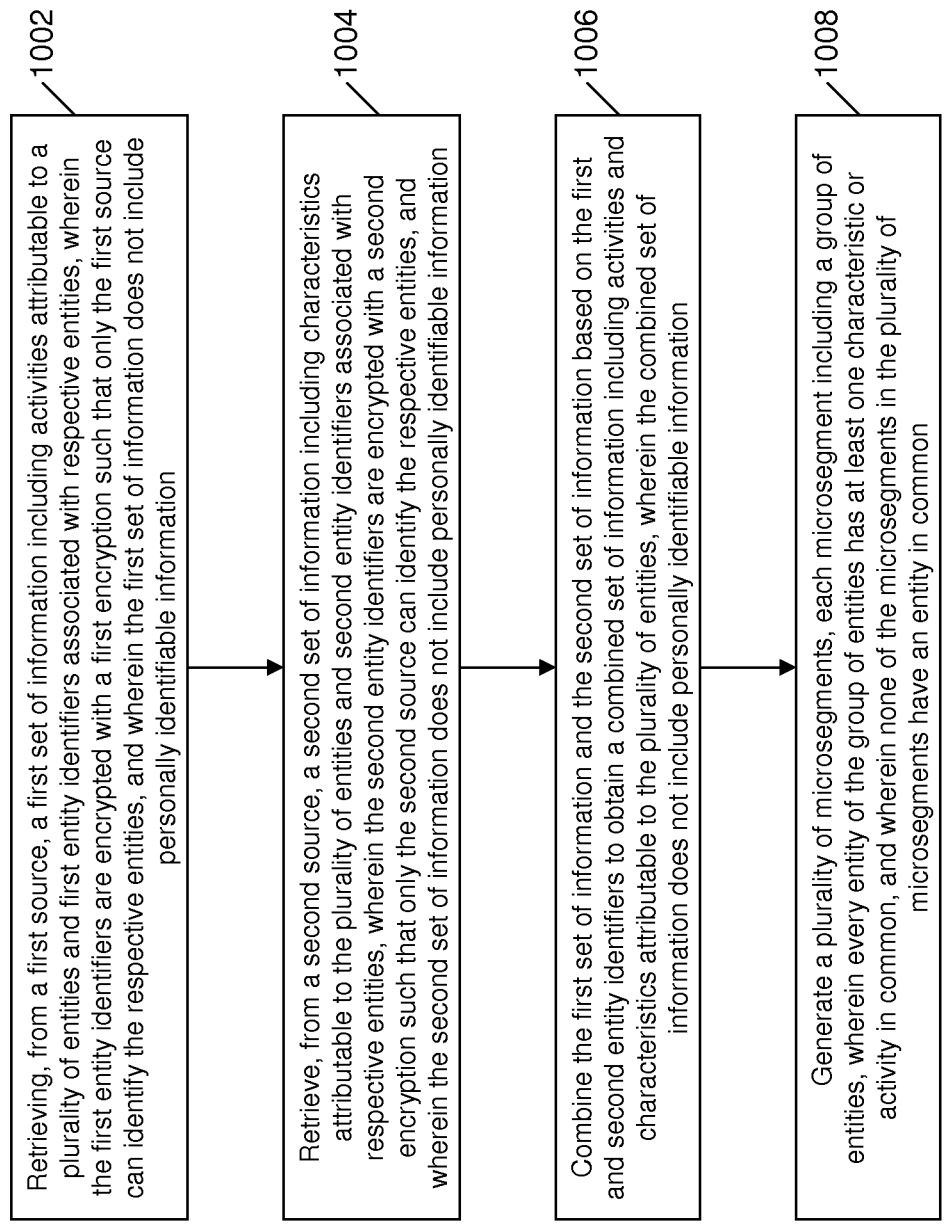
FIG. 10 is a flow chart illustrating an exemplary method for generating anonymous microsegments.

FIG. 10 illustrates a method for generating microsegments while maintaining anonymity of entities and using no personally identifiable information.

In step 1002, an environment (e.g., the linking environment 1302) may retrieve, from a first source (e.g., the activity environment 804), a first set of information including activities attributable to a plurality of entities and first entity identifiers associated with respective entities, wherein the first entity identifiers are encrypted with a first encryption such that only the first source can identify the respective entities, and wherein the first set of information does not include personally identifiable information. In one embodiment, the first encryption may be a one-way encryption. In an embodiment, the activities attributable to the plurality of entities may include financial transaction history associated with the plurality of entities, such as spending behaviors, spending propensities, etc.

In step 1004, the linking environment 802 may retrieve, from a second source (e.g., the demographic tracking agency 110), a second set of information including characteristics attributable to the plurality of entities and second entity identifiers associated with respective entities, wherein the second entity identifiers are encrypted with a second encryption such that only the second source can identify the respective entities, and wherein the second set of information does not include personally identifiable information. In an exemplary embodiment, the characteristics attributed to the plurality of entities may be demographical and geographical characteristics associated with the plurality of entities. In one embodiment, the first entity identifiers and the second entity identifiers may have at least one common identifier. In a further embodiment, all of the first entity identifiers and second entity identifiers may be common identifiers. In an embodiment, the second encryption may be a one-way encryption.

In step 1006, the linking environment 802 may combine the first set of information and the second set of information based on the first and second entity identifiers to obtain a combined set of information including activities and characteristics attributable to the plurality of entities, wherein the combined set of information does not include personally identifiable information. Then, in step 1008, the linking environment 802 may generate a plurality of microsegments, each microsegment including a group of entities, wherein every entity of the group of entities has at least one characteristic or activity in common, and wherein none of the microsegments in the plurality of microsegments have an entity in common.

In an exemplary embodiment, the group of entities may include at least ten entities. In an alternative embodiment, the group of entities may include as little as two entities. In another exemplary embodiment, every entity of the group of entities may have at least five characteristics in common. In a further embodiment, every entity of the group of entities may have all characteristics in common.

Additional Applications of Microsegments

Although the above methods and processes are disclosed primarily with reference to financial data and spending behaviors, it will be apparent to persons having skill in the relevant art that microsegments may be beneficial in a variety of other applications. Microsegments may be useful in the evaluation of consumer data, or in any industry where consumer privacy may need to be protected.

For instance, microsegments have useful applications in measuring the effectiveness of advertising or other consumer campaigns. A third party (e.g., the ad network 610, the merchant 104, a marketing and research firm, etc.) may desire to discover the effectiveness of a particular advertising campaign in reaching a specific set of consumers.

For example, a consumer electronics store may want to know the effectiveness of an advertising campaign initiated by the store and directed towards male consumers of a specific age and income group. The store may provide the financial transaction processing agency 108 with the demographic (e.g., demographical and geographical) data corresponding to the market. The financial transaction processing agency 108 may (e.g., using the linked environment 802 and activity environment 804 in order to protect consumer privacy and prevent any use of PII) identify microsegments with corresponding demographic data and summarize relevant spend behaviors for the identified microsegments. Summary of the relevant spend behaviors (e.g., showing an increase or decrease in spending at the consumer electronic store) for each microsegment (e.g., including the microsegment or microsegments of ideal consumers) may be provided to the consumer electronics store.

In some instances, a third party requester (e.g., the third party requester 1306) may provide the financial transaction processing agency 108 with a list of unique identifiers of consumers including consumers who were exposed to a particular advertisement and consumers who were not exposed to the advertisement. The financial transaction processing agency 108 may, utilizing the linked environment 802 to prevent the use of any PII (e.g., through one-way encryption), analyze relevant spend behaviors to identify the behavior of consumers that were exposed to the advertisement in contrast to the behavior of consumers that were unexposed to the advertisement. A summary of the analysis may be generated and provided to the third party requester.

Microsegment data may also be combined or matched with other sources of data. For example, other transaction processing agencies, advertising firms, advertising networks, publishers, etc. may provide information on consumer groupings of their own. The financial transaction processing agency 108 may link or match the received consumer groupings, such as by matching groupings to generated microsegments based on geographical or demographical data. In some instances, matching may be performed based on unique identifiers, in which case the linked environment 802 may be used in order to prevent the use of any PII in matching or linking the corresponding microsegments to the provided data.

Systems and methods disclosed herein may also have applications to the mobile communication device industry. For example, it may be common practice that mobile communication carriers provide mobile communication devices to consumers on a renewable contract for a specified time period (e.g., two years). The financial transaction processing agency 108 may be able to analyze spending behaviors for financial accounts to generate a microsegment or audience of individuals who may be nearing a renewal term on a contract with a mobile communication carrier (e.g., by identifying when a mobile communication device was purchased or two years of recurring payments to a mobile communication carrier). The audience may be provided to a mobile carrier as an ideal consumer base representing consumers in a position to change mobile communication carriers or take advantage of new contract offers. As another example, business travelers may be identified as a result of spending behaviors (e.g., weekday spending, a plurality of hotel, restaurant, and airline transactions, etc.) for generation of a corresponding audience of microsegments. Other beneficial applications of the systems and methods disclosed herein will be apparent to persons having skill in the relevant art(s).

Methods for the creations of microsegments and audiences may also be beneficial in industries where consumer privacy may need to be protected. For example, in the healthcare industry, hospitals, pharmaceutical companies, and insurance companies are all highly regulated and must maintain a great degree of privacy for their customers, patients, and potential consumers. The creation of microsegments and analysis of behavioral information may greatly benefit these entities. An insurance company may have a database of all of its customers, including demographic data and other health-related data. The insurance company may use a linking environment (e.g., the linking environment 802) to combine the demographic and health data (with any unique identifiers encrypted using a one-way encryption to protect customer privacy) with relevant data provided by a hospital (e.g., with unique identifiers also encrypted). Relevant data may include prescription information, illness information, etc. The insurance company may combine the information and generate microsegments based on the demographic data health-related data, which may be analyzed to obtain potential health issues for entities in each microsegment or other useful information.

A pharmaceutical company may have demographical data on potential customer, and provide the geographical data (with all potentially personally identifiable information removed) to the insurance company. The insurance company may match each potential customer to a microsegment, and apply analyzed information, such as potential health issues for entities of that microsegment, to the potential customer. The information may then be provided to the pharmaceutical company without the use of any personally identifiable information.

Microsegments may also be useful in political campaign financing, where there is a need for protecting personally identifiable information, such as by identifying potential contributors while maintaining confidentiality and privacy where necessary. Microsegments may also be beneficial in the profiling of potential consumers for the purposes of offering a payment card (e.g., a credit card). For example, assignee MasterCard has developed a method for making payment cards responsive to consumer needs based on market segment characteristics, such as demographics and behavioral information, as disclosed in U.S. Patent Publication No. 2008/0133325 to De et al. (originally filed as U.S. patent application Ser. No. 11/755,288 on May 30, 2007). Microsegments may be used to identify consumer needs based on demographics and behavioral information in a much more efficient, more accurate fashion, while still maintaining consumer privacy.

Where methods described above indicate certain events occurring in certain orders, the ordering of certain events may be modified. Moreover, while a process depicted as a flowchart, block diagram, etc. may describe the operations of the system in a sequential manner, it should be understood that many of the system's operations can occur concurrently or in a different order. For example, although the linking environment 802 is illustrated in FIGS. 8A and 8B as analyzing spend behaviors (step 830) before receiving the cleansed geographical-demographical data (step 838), the linking environment 802 may instead first receive the cleaned geographical-demographical data prior to analyzing spend behaviors, or may perform each function concurrently.

Techniques consistent with the present disclosure provide, among other features, a system and method for protecting consumer privacy in the creation of microsegments and audiences. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method of generating audiences of a population of entities without the use of personally identifiable information, comprising:
storing, in a first database device, a first set of information on a multitude of entities, wherein said first set of information stored in said first database device is not personally identifiable and includes at least (i) activities attributable to a first multitude of entities and (ii) first entity identifiers associated with respective entities of the first multitude of entities, said first entity identifiers having been encrypted with a first one-way encryption;
storing, in a second database device, a second set of information including at least (i) characteristics attributable to the first multitude of entities and (ii) second entity identifiers associated with respective entities of the first multitude of entities, said second entity identifiers having been encrypted with a second one-way encryption;
retrieving, by a processing device, from said first database device that does not store personally identifiable information, the first set of non-personally identifiable information including (i) the activities attributable to the first multitude of entities and (ii) the first one-way encrypted entity identifiers associated with respective entities of the first multitude of entities, wherein the processor cannot uniquely identify a single entity from the first multitude of entities on a basis of said retrieved first set of non-personally identifiable information;
retrieving, by the processing device, from the second database device, the second set of information including (i) the characteristics attributable to the first multitude of entities and (ii) the second one-way encrypted entity identifiers associated with respective entities of the first multitude of entities and that respectively correlate to said first encrypted entity identifiers, wherein the processing device cannot uniquely identify a single entity from the first multitude of entities on a basis of said second one-way encrypted identifiers;
without using personally identifiable information, combining, by the processing device, the first set of non-personally identifiable information retrieved from the first database device and the second set of information retrieved from the second database device using the first and second one-way encrypted entity identifiers to obtain a combined set of information including activities and characteristics associated with the first multitude of entities;
without using personally identifiable information, generating, by the processing device, a multitude of microsegments based on at least one of (1) selected activities criteria and (2) selected characteristics criteria from the combined set of information, wherein the identity of a single entity cannot be determined from the generated microsegment;
receiving, from a third party, by the processing device, a request for creation of an audience, said request including a third set of information including non-personally identifiable information pertaining to characteristics attributable to a second multitude of entities, wherein the third party maintains contact information for entities in the second multitude of entities;
matching, by the processing device, characteristics in respective microsegments to characteristics attributable to the second multitude of entities included in the non-personally identifiable information received from the third party;
determining, by the processing device, as a result of said characteristics matching, an audience of entities that (i) does not include personally identifiable information and (ii) has a propensity to carry out certain activities based on the selected activities criteria and/or selected characteristics criteria used in forming the microsegments; and
transmitting, by the processing device, the determined audience of entities to the third party, enabling the third party to contact a second audience of entities, using the contact information maintained by the third party, to induce desired activities in at least a portion of the entities in the second audience.

2. The method of claim 1, wherein
the second set of information, stored in the second database, may or may not include personally identifiable information,
the population of entities are people and/or businesses,
the activities attributable to the first multitude of entities are financial transactions associated with the first multitude of entities, and
the characteristics attributable to the first multitude of entities are demographics and/or geographical characteristics of the first multitude of entities.

3. The method of claim 1, wherein at least one of the first encrypted entity identifiers and at least one of the second encrypted entity identifiers are common encrypted entity identifiers.

4. The method of claim 1, wherein the selected characteristics criteria of each microsegment is based on characteristics attributable to each of the entities included in the microsegment.

5. The method of claim 1, wherein matching characteristics of respective microsegments to characteristics of entities in the second multitude of entities includes matching all of the characteristics of entities in the second multitude of entities.

6. The method of claim 1, wherein the first multitude of entities and the second multitude of entities may or may not have common entities.

7. A system for generating audiences of a population of entities without the use of personally identifiable information, comprising:
a first database device configured to store a first set of information including activities attributable to a first multitude of entities and first entity identifiers associated with respective entities of the first multitude of entities, wherein the first set of information, stored in the first database, does not include personally identifiable information;
a second database device configured to store a second set of information including characteristics attributable to the first multitude of entities and second entity identifiers associated with respective entities of the first multitude of entities; and a processing device configured to
> retrieve the first set of non-personally identifiable information from the first database device and the second set of information from the second database device, wherein (1) the first set of non-personally identifiable information includes first one-way encrypted identifiers and the second set of information includes second one-way encrypted entity identifiers that respectively correlate to the first one-way encrypted identifiers and (2) the processor cannot uniquely identify a single entity from the first multitude of entities on a basis of said first and second one-way encrypted identifiers,
>
> combine, without using personally identifiable information, the first set of non-personally identifiable information and the second set of information using the first and second one-way encrypted entity identifiers to obtain a combined set of information including activities and characteristics associated with the first multitude of entities,
>
> without using personally identifiable information, generate a multitude of microsegments based on at least one of (1) selected activities criteria and (2) selected characteristics criteria from the combined set of information, wherein the identity of a single entity cannot be determined from the generated microsegments,
>
> receive, from a third party, a request for creation of an audience, said request including a third set of information including non-personally identifiable information pertaining to characteristics attributable to a second multitude of entities, wherein the third party maintains contact information for entities in the second multitude of entities,
>
> match characteristics in respective microsegments to characteristics of entities in the second multitude of entities included in the non-personally identifiable information received from the third party; and
>
> determine, based on matched characteristics, an audience of entities that (i) does not include personally identifiable information and (ii) has a propensity to carry out certain activities based on the selected activities criteria and/or selected characteristics criteria used in forming the microsegments;
>
> transmit the determined audience of entities to the third party, enabling the third party to contact a second audience, using the contact information maintained by the third party to induce desired activities in at least a portion of the entities in the second audience.

8. The system of claim 7, wherein
the second set of information, stored in the second database, may or may not include personally identifiable information,
the population of entities are people and/or businesses,
the activities attributable to the first multitude of entities are financial transactions associated with the first multitude of entities, and
the characteristics attributable to the first multitude of entities are demographics and/or geographical characteristics of the first multitude of entities.

9. The system of claim 7, wherein the first one-way entity identifiers are encrypted with a first one-way encryption prior to retrieval by the processor.

10. The system of claim 9, wherein the second one-way entity identifiers are encrypted with a second one-way encryption prior to retrieval by the processor.

11. The system of claim 7, wherein the selected characteristics criteria of each microsegment is based on characteristics attributable to each of the entities included in the microsegment.

12. The system of claim 7, wherein matching characteristics of respective microsegments to characteristics of entities in the second multitude of entities includes matching all of the characteristics of entities in the second multitude of entities.

13. The system of claim 7, wherein the first multitude of entities and the second multitude of entities may or may not have common entities.

* * * * *